United States Patent
Zandani et al.

(10) Patent No.: US 9,888,027 B2
(45) Date of Patent: **\*Feb. 6, 2018**

(54) SECURITY RISK MAPPING OF POTENTIAL TARGETS

(71) Applicant: CYTEGIC LTD., Tel-Aviv (IL)

(72) Inventors: Shay Zandani, Rehovot (IL); Elon Kaplan, Ramat Hasharon (IL)

(73) Assignee: CYTEGIC LTD., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,702

(22) Filed: Jan. 2, 2017

(65) Prior Publication Data
US 2017/0111387 A1    Apr. 20, 2017

Related U.S. Application Data

(63) Continuation of application No. 14/574,990, filed on Dec. 18, 2014, now Pat. No. 9,537,881.

(60) Provisional application No. 61/917,596, filed on Dec. 18, 2013.

(51) Int. Cl.
    *H04L 29/06*   (2006.01)

(52) U.S. Cl.
    CPC ...... *H04L 63/1433* (2013.01); *H04L 63/1466* (2013.01)

(58) Field of Classification Search
    CPC .................................................. H04L 63/1433
    See application file for complete search history.

(56) References Cited

U.S. PATENT DOCUMENTS

| | | | |
|---|---|---|---|
| 6,374,358 B1 | 4/2002 | Townsend | |
| 2008/0034424 A1 | 2/2008 | Overcash | |
| 2009/0099885 A1 | 4/2009 | Sung | |
| 2011/0252479 A1 | 10/2011 | Beresnevichiene | |
| 2012/0210434 A1* | 8/2012 | Curtis | G06F 21/577 726/25 |
| 2012/0233698 A1 | 9/2012 | Watters | |
| 2015/0163242 A1* | 6/2015 | Laidlaw | G06F 21/552 726/22 |
| 2016/0021056 A1 | 1/2016 | Chesla | |
| 2016/0359899 A1* | 12/2016 | Zandani | H04L 63/1433 |

OTHER PUBLICATIONS

Simmons, Chris et al. 'AVOIDIT: A cyber attack taxonomy.' (2009).

* cited by examiner

*Primary Examiner* — Shawnchoy Rahman
(74) *Attorney, Agent, or Firm* — The Roy Gross Law Firm, LLC; Roy Gross

(57) ABSTRACT

A method comprising: receiving an identification of the target assets at risk of being attacked and of the technology layers of the organization, wherein each of the target assets may instantiate in multiple ones of the technology layers; constructing multiple attack vectors for each of at least a portion of said target assets, by determining for each attack vector three target dimensions, each of a category of: method of achieving a malicious objective, method of attack enablement and method of initial penetration; and estimating the security risk of each of said multiple attack vectors, wherein the estimating of the security risk of an attack vector of said multiple attack vectors is based on probabilities of success of the combinations of a technology layer and an attack method characterizing each of the target dimensions of the attack vector.

16 Claims, 3 Drawing Sheets

SECURITY RISK MAPPING OF POTENTIAL TARGETS

CROSS-REFERENCE TO RELATED APPLICATIONS

This application is a continuation of U.S. patent application Ser. No. 14/574,990, filed Dec. 18, 2014, which claims the benefit of U.S. Provisional Patent Application No. 61/917,596, filed Dec. 18, 2013, both of which are incorporated herein by reference in their entirety.

FIELD OF THE INVENTION

The invention relates to methods of organizational defenses against cyber attacks.

BACKGROUND

The term "attack vector", with respect to computer systems and networks, is derived from the term "vector" in biology, which means an agent that carries and transmits an infectious pathogen into another living organism. In the same sense, an attack vector is a path or means by which an attacker (e.g., a hacker or cracker) may access a computer system or network for the purpose of infecting the computer with malicious code or inflict malicious outcome. Common vectors may utilize buffer overflows, HTML email with JavaScript or other scripting enhancements, networking protocol flaws or human manipulation (i.e., social engineering). Attack vectors may include e-mail attachments, pop-up windows, instant messages viruses or worms.

Firewalls and anti-virus software are commonly used to prevent, identify or block attack vectors. However, attack vectors may still by-pass such defense methods.

Identification of attack vectors challenging organizational defenses is crucial in the prioritization of defense investments and actions. The critical path of attack represents the comprehensive vulnerability of organizational resources and therefore the actual defense posture.

Simulation of attack vectors is done to date by human penetration testing, which is a long and highly skilled process based on professional experience of specific expert or group of experts. Thus, there is a critical need to generate rapidly and continuously simulated attack vectors based on organizational characteristics rather than human expert idiosyncratic expertise.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for security risk mapping of attack vectors of target assets of an organization at risk of being attacked, wherein each of the attack vectors is defined by target dimensions, each target dimension characterized by a combination of a technology layer and an attack method, the method comprising using at least one hardware processor for: receiving an identification of the target assets at risk of being attacked and of the technology layers of the organization, wherein each of the target assets may instantiate in multiple ones of the technology layers; constructing multiple attack vectors for each of at least a portion of said target assets, by determining for each attack vector three target dimensions, each of a category of: method of achieving a malicious objective, method of attack enablement and method of initial penetration; and estimating the security risk of each of said multiple attack vectors, wherein the estimating of the security risk of an attack vector of said multiple attack vectors is based on probabilities of success of the combinations of a technology layer and an attack method characterizing each of the target dimensions of the attack vector.

There is provided, in accordance with another embodiment, a computer program product for security risk mapping of attack vectors of target assets of an organization at risk of being attacked, wherein each of the attack vectors is defined by target dimensions, each target dimension characterized by a combination of a technology layer and an attack method, the computer program product comprising a non-transitory computer-readable storage medium having program code embodied therewith, the program code executable by at least one hardware processor to: receive an identification of the target assets at risk of being attacked and of the technology layers of the organization, wherein each of the target assets may instantiate in multiple ones of the technology layers; construct multiple attack vectors for each of at least a portion of said target assets, by determining for each attack vector three target dimensions, each of a category of: method of achieving a malicious objective, method of attack enablement and method of initial penetration; and estimate the security risk of each of said multiple attack vectors, wherein the estimating of the security risk of an attack vector of said multiple attack vectors is based on probabilities of success of the combinations of a technology layer and an attack method characterizing each of the target dimensions of the attack vector.

There is provided, in accordance with a further embodiment, a system comprising: a non-transitory computer-readable storage medium having program code stored thereon; and at least one hardware processor configured to execute said program code to: receive an identification of the target assets at risk of being attacked and of the technology layers of the organization, wherein each of the target assets may instantiate in multiple ones of the technology layers; construct multiple attack vectors for each of at least a portion of said target assets, by determining for each attack vector three target dimensions, each of a category of: method of achieving a malicious objective, method of attack enablement and method of initial penetration; and estimate the security risk of each of said multiple attack vectors, wherein the estimating of the security risk of an attack vector of said multiple attack vectors is based on probabilities of success of the combinations of a technology layer and an attack method characterizing each of the target dimensions of the attack vector.

In some embodiments, the constructing of the multiple attack vectors is performed in an inverse and tree-like manner.

In some embodiments, the target dimension of method of attack enablement comprises a succession of several attack method and technology layer combinations, thereby forming a path of the method of enablement.

In some embodiments, the method further comprises identifying relevant attack methods for each of said target assets.

In some embodiments, the constructing of multiple attack vectors for each of at least a portion of said target assets comprises: determining multiple target dimension of method of achieving a malicious objective for each instantiation of said each of at least a portion of said target assets in a technology layer of the multiple predefined technology layers; determining multiple target dimensions of method of attack enablement for at least a portion of the determined multiple target dimensions of method of achieving a malicious objective; and determining multiple target dimensions of method of initial penetration for at least a portion of the determined multiple target dimensions of method of attack enablement.

In some embodiments, the determining of multiple target dimension of method of achieving a malicious objective for an instantiation of a target asset of said each instantiation of said each of at least a portion of said target assets comprises identifying multiple combinations of attack methods and technology layers that would enable achieving malicious objectives with respect to the instantiation of the target asset, wherein combinations of the multiple combinations of attack methods and technology layers which comprise attack methods applied on the technology layer at which said target asset is instantiated are excluded; the determining of multiple target dimension of method of attack enablement for a target dimension of method of achieving a malicious objective of said at least a portion of the determined multiple target dimensions of method of achieving a malicious objective comprises identifying multiple combinations of attack methods and technology layers that would enable a potential attacker to utilize said target dimension of method of achieving a malicious objective once he penetrates the organization system, wherein combinations of the multiple combinations of attack methods and technology layers which comprise attack methods applied on the technology layer at which said target asset is instantiated or at which said method of achieving a malicious objective is performed are excluded; and the determining of multiple target dimension of method of initial penetration for a target dimension of method of attack enablement of said at least a portion of the determined multiple target dimensions of method of attack enablement comprises identifying multiple combinations of attack methods and technology layers that would allow initial penetration to the organization to achieve the method of malicious objective with respect to the instantiation of the target asset, wherein combinations of the multiple combinations of attack methods and technology layers which comprise attack methods applied on the technology layer at which said target asset is instantiated or at which said method of achieving a malicious objective is performed are excluded.

In some embodiments, the estimating of the security risk of the attack vector is performed by multiplying the probabilities of success of the combinations of a technology layer and an attack method characterizing each of the target dimensions of the attack vector.

In some embodiments, the probability of success of the combinations of a technology layer and an attack method characterizing the target dimension of method of attack enablement of the attack vector is estimated by calculating the mean value of the probabilities of success of all the possible combinations of a technology layer and an attack method for the target dimension of method of attack enablement, wherein the technology layer at which the target asset of said attack vector is instantiated and the technology layers used by the attack methods of the other two target dimensions are excluded.

In some embodiments, only the top half probabilities of success of the probabilities of success of all the possible combinations are considered.

In some embodiments, the method further comprises calculating the probabilities of success of the combinations of a technology layer and an attack method based on the maturity of controls of the organization.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Glossary

Figure 1:
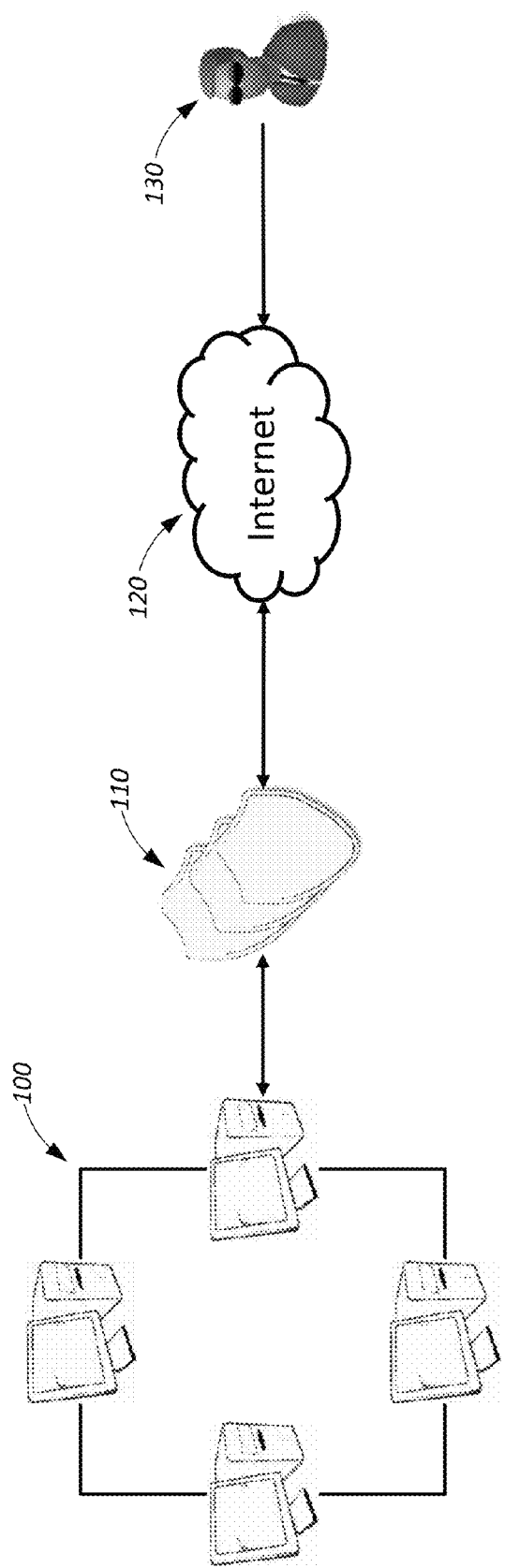
FIG. 1 shows a schematic illustration of a cyber attack.

Organization: may refer to any organization such as corporations, governments, non-governmental organizations, international organizations, armed forces, charities, not-for-profit corporations, partnerships, cooperatives, universities or hybrid organization companies (e.g., private, public, government etc.).

Technology layer: refers to pre-defined layers of an organizational system at which attackers operate, such as, the application layer, the data layer or the Local Area Network layer. The layers of an organizational system may change from time to time according to the developments of the relevant technology.

Target Asset: an abstract object, technology or process that is the ultimate target of a cyber attack. An asset may potentially instantiate in any technology layer. For example, a bank's e-banking website is a specific instance of the abstract "Transaction Web Application" asset at the web server technology layer.

Attack method: an abstract type of cyber attack that is available to an attacker, if that attacker has the required skills and resources. Attack method is defined by applicability to various technology layers, and required skills and resources to carry out the attack against the technology layer. For example: resource depletion, abuse of functionality, social engineering, etc.

Unless specifically stated otherwise, as apparent from the following discussions, it is appreciated that throughout the specification discussions utilizing terms such as "processing", "computing", "calculating", "determining", or the like, refer to the action and/or process of a computing system or a similar electronic computing device, that manipulate and/or transform data represented as physical, such as electronic, quantities within the computing system's registers and/or memories into other data similarly represented as physical quantities within the computing system's memories, registers or other such.

Some embodiments may be implemented, for example, using a computer-readable medium or article which may store an instruction or a set of instructions that, if executed by a computer (for example, by a hardware processor and/or by other suitable machines), cause the computer to perform a method and/or operations in accordance with embodiments of the invention. Such a computer may include, for example, any suitable processing platform, computing platform, computing device, processing device, computing system, processing system, computer, processor, gaming console or the like, and may be implemented using any suitable combination of hardware and/or software. The computer-readable medium or article may include, for example, any type of disk including floppy disks, optical disks, CD-ROMs, magnetic-optical disks, read-only memories (ROMs), random access memories (RAMs), flash memories, electrically programmable read-only memories (EPROMs), electrically erasable and programmable read only memories (EEPROMs), magnetic or optical cards, or any other type of media suitable for storing electronic instructions, and capable of being coupled to a computer system bus.

The disclosed technique provides methods for efficient, comprehensive and well-suited mapping of security soft spots of an organization by constructing attack vectors for target assets of the organization identified as being at risk of being attacked and estimating the security risk each of these attack vectors poses. This may enable the organization to allocate greater protection resources to those target assets with higher probability of being successfully attacked, thereby balancing a tradeoff between the organization's limited resources (which limits its ability to allocate protection resources) and its desire to protect its assets and prevent security breach.

Construction of the attack vectors in accordance with the disclosed technique is performed in an inverse and tree-like manner. Such construction is highly advantageous and may allow efficient and comprehensive mapping of the organization soft spots. The construction of the attack vectors further allows mapping of the organization soft spots and computing the risk they carry in several levels: in a micro-level, by identifying and determining target dimensions and computing an attacker's probability of success in utilizing them, and in a macro-level, by identifying and constructing attack vectors, which are combinations of target dimensions, and computing an attacker's probability of success in utilizing them.

The present disclosure may be better understood with reference to the accompanying figures. Reference is now made to FIG. 1, which shows a schematic illustration of a cyber attack. An organizational computer network 100 may be connected to an external network (e.g. the Internet) 120 via organizational defense layers 110. Defense layers 110 may be intended to protect computer network 100 from cyber attacks initiated by an attacker 130, who may try to access computer network 100 via the Internet 120. Attacker 130 may use various attack vectors in order to infect network 100 with malicious code or inflict on network 100 malicious outcome.

Figure 2:
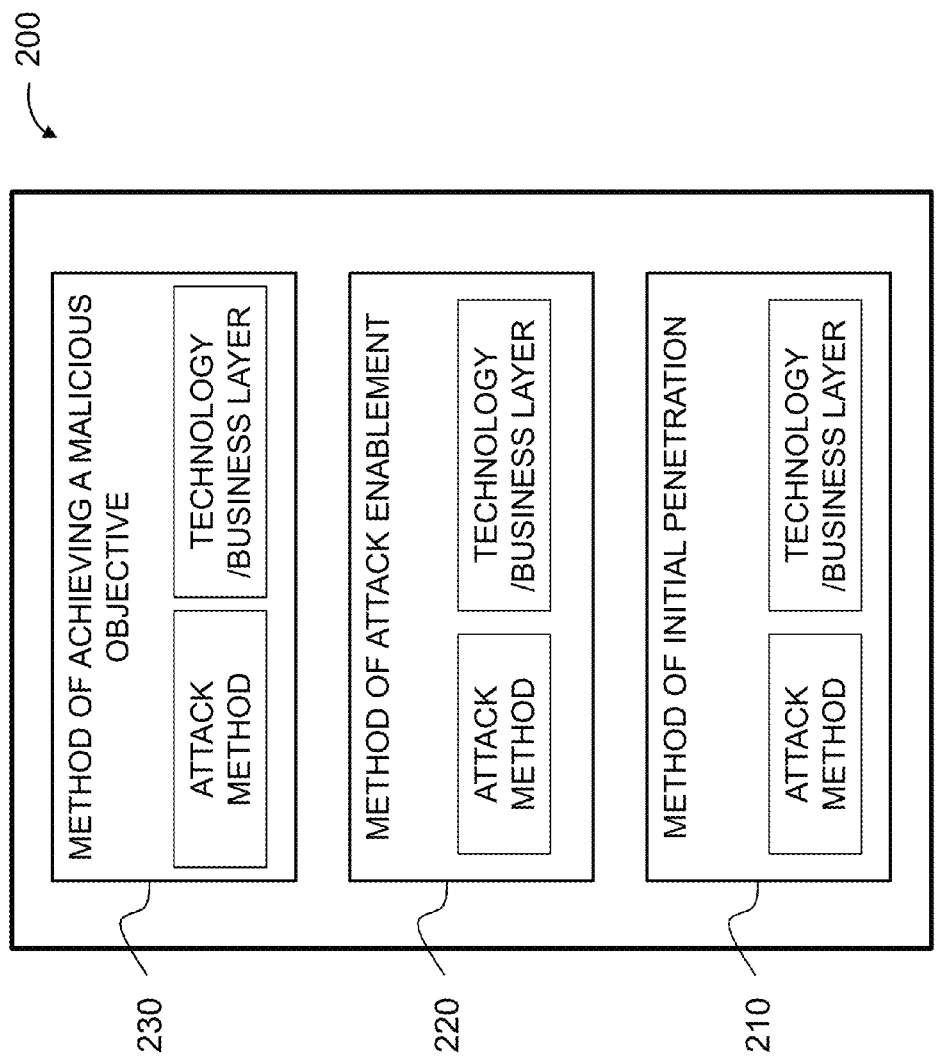
FIG. 2 shows a schematic illustration of a general structure of an attack vector, constructed and operative in accordance with an embodiment of the disclosed technique.

Reference is now made to FIG. 2, which shows a schematic illustration of a general structure of an attack vector 200, constructed and operative in accordance with an embodiment of the disclosed technique. Attack vector 200 includes target dimensions, while each type of target dimension is defined by two characteristics: a technology layer and an attack method. Thus, in general, each target dimension is characterized by a combination of an attack method and a technology layer to which the attack method is applied.

More specifically, attack vector 200 is constructed such that it includes three categories of target dimensions which describe the path of the attack: a target dimension 210 describing the method that may be used for initial penetration into the organization (i.e., a target dimension of method of initial penetration), a target dimension 220 describing the method for enabling the attack (i.e., a target dimension of method of attack enablement) and a target dimension 230 describing the method for achieving the malicious objective (i.e., a target dimension of method of achieving a malicious objective). Target dimensions of method of initial penetration may include, for example, social engineering (i.e., attack method) on web-user technology (i.e., technology layer). Target dimensions of method of attack enablement may include, for example, code injection (i.e., attack method) on application technology (i.e., technology layer) or network reconnaissance (i.e., attack method) on LAN technology (i.e., technology layer). Target dimension 220 of method of attack enablement, as opposed to target dimensions 210 and 230, may further include a succession of several attack method and technology layer combinations, thus forming a path of the method of enablement (i.e., target dimension 220). Target dimensions of methods of achieving a malicious objective may include, for example, DB (database) injection (i.e., attack method) on DB technology (i.e., technology layer). By way of example, a target asset may be identified as a secret file. An attack vector that may be exercised by a potential attacker may include: a method of initial penetration—employing social engineering skills to convince an employee at the organization to surrender his or her user name and password; a method of attack enablement—network access through an active directory, to enable the attacker to reach the repository where the secret file is stored; and a method of achieving malicious objective—extracting the secret file from within the organizational network by sending it vie email to an external source.

An exemplary list of 15 common technology layers may include the following layers: Application, Data, Database, Local Area Network (LAN), Server, Web Application (WebApp), WebUser, Industrial Control Systems (ICS), Mobile, Voice over Internet Protocol (VoIP), Software as a Service (SaaS), Infrastructure as a Service (IaaS), Platform as a Service (PaaS), Managed Security Services Provider (MSSP) and Wide Area Network (WAN).

An exemplary list of 12 attack methods may include the following methods: Data Structure Attacks, Data Leakage Attacks, Resource Depletion, Injection, Spoofing, Time and State Attacks, Abuse of Functionality, Probabalistic Techniques, Exploitation of Authentication, Exploitation of Privilege/Trust, Physical Security Attacks, Social Engineering Attacks and Network Reconnaisance.

Target assets may be, for example, client data (e.g., data included in an account of a client of a bank), availability of services (services such as automatic teller machines, communication between a bank and a stock exchange and internet communication), Intellectual Property (IP) (e.g., drawings of assets, information and algorithms), suppliers data and reputation. The asset of client data may instantiate, for example, in technology layers such as: employee internet browsing (i.e., a communication layer of a work station of an employee), workstation (i.e., which may be connected to the internet or not), server infrastructure (i.e., physical infrastructure of a server), data processing (e.g., data processing systems and applications such as customer relationship management) and data storage (e.g., data warehouse, backup etc.). The asset of availability of services may instantiate, for example, in technology layers such as: mobile (e.g., mobile communication), network infrastructure, server infrastructure and data storage. The asset of IP may instantiate, for example, in technology layers such as: network infrastructure, workstations and data storage. The asset of suppliers data may instantiate, for example, in technology layers such as: employee internet browsing, workstations, server infrastructure data processing and data storage. The asset of reputation may instantiate, for example, in technology layers such as: mobile (e.g., mobile application or mobile internet site), network infrastructure, server infrastructure and data storage.

A Probability Of Success (POS) of an attacker utilizing a combination of an attack method applied on a specific technology layer may be calculated for each such combination. For example, the POS may be calculated for such combinations relevant for each organization based on the maturity of its controls. Thus, the above listed 15 technology layers and 12 attack methods may form 180 such combinations (15*12=180). A probability of success may be calculated for each such combination. The probability of success may be calculated, for example, according to the method disclosed in US Provisional Application No. 61/828,347.

Figure 3:
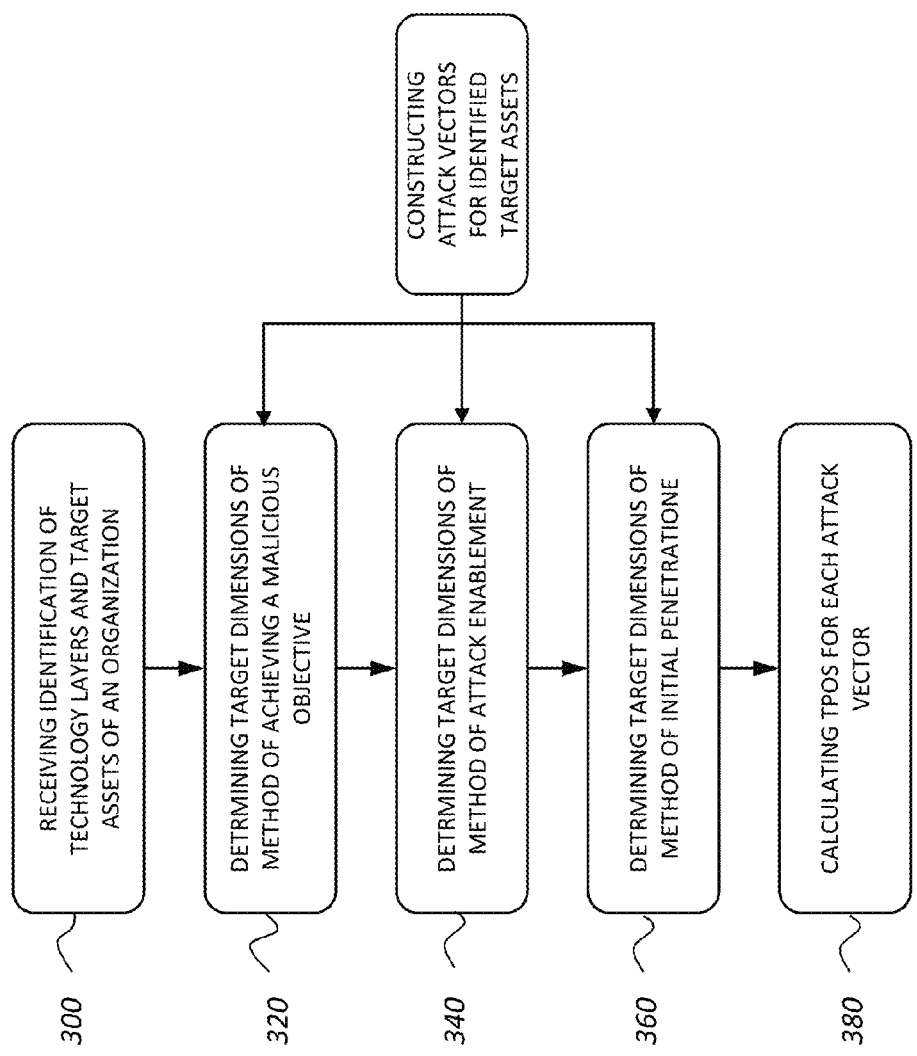
FIG. 3 shows a flowchart of an exemplary method for mapping organizational soft spots according to the risk they carry, constructed and operative in accordance with another embodiment of the disclosed technique.

Reference is now made to FIG. 3, which shows a flowchart of an exemplary method for mapping organizational soft spots according to the risk they carry, constructed and operative in accordance with another embodiment of the disclosed technique. In a step 300, an identification of technology layers of the organization and potential target assets relevant for the specific organization may be received. Such identification may be received from the organization, e.g., from its Information Technology manager. In some embodiments, the method may include identifying of the technology layers of the organization and/or of potential target assets relevant for the specific organization. Each of the identified target asset may instantiate in each one of the identified technology layers.

Attack methods relevant for each type of a target asset may be identified in advance. Such identification of attack methods relevant for a certain target asset may be performed, for example, based on profiles of attackers which may be identified as prone to take interest in the target asset. Such attackers' profiles may be obtained or identified according to available global data and reports. Each attacker profile may describe the attacker behavior including typical attack methods. Thus, attack methods associated with attackers which are identified as prone to attack a target asset may be identified as attack methods relevant to the specific target asset. In some cases, the instantiation of a target asset in a specific technological layer may affect the relevance of attack methods and therefore may be considered. The identified attack methods may be characterized as applicable for initial penetration and/or achieving a malicious objective.

In steps 320, 340 and 360, constructing of attack vectors relevant for at least some of the identified potential target assets is performed. The construction of the attack vectors is generally performed by determining three target dimensions for each attack vector, each target dimension of each category, as shown in FIG. 2. The attack vectors may be constructed in an inverse manner: starting from the end of the attack path, i.e., determining target dimensions of method of achieving a malicious objective, towards the beginning of the attack path, i.e., determining target dimensions of method of initial penetration. With reference to FIG. 2, target dimensions 230 are determined first, then target dimensions 220 and last, target dimensions 210. Furthermore, the attack vectors may be constructed in a tree-like manner, as for each identified potential target asset (or for each of some of them) instantiating in a specific technology layer, a plurality of relevant target dimensions of methods of achieving a malicious objective may be identified and accordingly determined (step 320). Next, for each determined target dimension of method of achieving a malicious objective (or for each of some of them), a plurality of relevant target dimensions of method of attack enablement may be identified, and so on. One may choose to construct attack vectors only for a portion of the identified potential target assets or only for specific instantiations of identified target assets in specific technology layers, due to the specific organization needs, priorities, requirements or limitations (e.g., budget limitations). Such filtering may be further performed during the attack vectors construction process, for example, by determining target dimensions of method of attack enablement (step 340) only for a portion of the determined target dimensions of method of achieving malicious objective, and so on.

More specifically, in a step 320, determining multiple target dimensions of method of achieving a malicious objective for at least a portion of the identified potential target assets is performed. Such determination may be performed by identifying or filtering the combinations of attack vectors and technology layers for each instantiation (i.e., at a specific technology layer) of each identified target asset (or for a portion of them) that would enable achieving malicious objectives with respect to the instantiated target asset. Generally, the method of achieving a malicious objective, for an instantiation of a target asset, may be exercised by using various attack methods in different layers. However, for each instantiation of a target asset, combinations including attack methods applied on the technology layer at which the target is instantiated would be excluded. For example, the above list of 15 technology layers would be reduced to 14 technology layers, such that together with the listed 12 attack methods would form 168 possible combinations. These 168 combinations may be then filtered to receive combinations that would allow achieving a malicious objective with respect to the instantiated target asset. For example, only combinations including attack methods which were characterized as applicable to achieving the malicious objective may be considered. Furthermore filtering may be performed according to various criterions and according to the organization policy or needs.

Methods of achieving a malicious objective may include, for example, channels through which harvesting of secret information from an organization is made possible or channels through which damage may be caused to a computer system of the organization.

In a step 340, determining multiple target dimensions of method of attack enablement for at least a portion of the determined target dimensions of method of achieving a malicious objective may be performed. The determination of the target dimensions of method of attack enablement may be performed by identifying or filtering the combinations of attack methods and technology layers for each determined target dimension of achieving a malicious objective (or for a portion of them) that would enable a potential attacker to utilize the methods of achieving a malicious objective determined is step 320 once he penetrates the organization system or network according to step 360. Methods of attack enablement may include, for example, methods of navigation from a point of penetration into the organization (see step 360 herein below) to a point where one of the channels of the examples of step 320 begins.

Generally, the method of attack enablement, for a method of achieving a malicious objective, may be exercised by using various attack methods in different technology layers. For each method of achieving a malicious objective with respect to an instantiation of a target asset, combinations including attack methods applied on the technology layer at which the target is instantiated or at which the method of achieving a malicious objective is performed may be excluded. For example, the above list of 15 technology layers would be reduced to 13 technology layers, such that together with the listed 12 attack methods would form 156 possible combinations. However, as described above, a method of attack enablement may include a path of successive such combinations which extends along several technology layers. This may add numerous path combinations which may be difficult to filter and model. Thus, these target dimensions may be referred as an abstraction cloud which includes numerous possibilities to navigate from the technology layer of initial penetration (step 360 below) to the technology layer of achieving a malicious objective (step 320 above).

In a step 360, determining multiple target dimensions of method of initial penetration for at least a portion of the determined target dimensions of method of attack enablement may be performed. The target dimensions of method of initial penetration are determined such that to allow a potential attacker to penetrate the organization system or network. The penetration is performed at some technology layer while using some attack method to penetrate, i.e., by utilizing a method of attack and technology layer combination. Methods of initial penetration may include, for example, methods of making an initial penetration into a network of the organization. For instance, these may include brute-force password cracking, acquisition of passwords through social engineering, etc.

Generally, the method of initial penetration may be exercised by using various attack methods in different layers. For each method of initial penetration with respect to an instantiation of a target asset, combinations including attack methods applied on the technology layer at which the target is instantiated or at which the method of achieving a malicious objective is performed may be excluded. For example, the above list of 15 technology layers would be reduced to 13 technology layers, such that together with the listed 12 attack methods would form 156 possible combinations. These 156 combinations may be then filtered to receive combinations that would allow initial penetration to the organization to achieve the method of malicious objective and with respect to the instantiated target asset. For example, only combinations including attack methods which were characterized as applicable to initial penetration may be considered. Furthermore filtering may be performed according to various criterions and according to the organization policy or needs.

In a step 380, Total Probability Of Success (TPOS) may be calculated for each attack vector. The TPOS may be calculated based on the POS of each combination (i.e., attack method and technology layer combination) of the attack vector. Generally, an attack vector constructed according to the disclosed technique may include three or more such combinations: one for each target dimension and further ones for the target dimension of method of attack enablement (i.e., in case the method of attack enablement is a path constructed of successive combinations). The POSs relating to an attack vector may be then multiplied to receive a TPOS.

A POS for the target dimension of method of attack enablement of each attack vector may be estimated. The estimation may be based on the POSs of the possible combinations of attack method and technology layer for this dimension. For each attack vector, the technology layer at which the target asset of the attack vector is instantiated and the technology layers used by the attack methods of the other two target dimensions may be excluded. For example, the above list of 15 technology layers would be reduced to 12 technology layers, such that together with the listed 12 attack methods would form 144 possible combinations with 144 POSs. One may consider only the top half POSs, since the attack vectors with the higher POSs pose a greater risk and therefore of more interest to the organization. One may then calculate the mean POS value of this top half of POSs. Back to the example, only the 122 (i.e., half of 144) top POSs may be considered and their mean value may be calculated. Such a mean value may be calculated for each attack vector and considered as an estimated POS of the method of attack enablement.

Such estimation may make a good approximation to the POS of a method of attack enablement for the purpose of the disclosed technique since it considers the mean POS value of attack vectors which might pose a substantial threat to the organization (i.e., considering the top half of the POSs of the possible combinations). Furthermore, POSs of successive combinations are necessarily lower and multiplication of successive POSs of higher values (i.e., close to 1) generally does not substantially change the POS value. Top risk Attack vectors (i.e., having the highest TPOA) and therefrom soft spots in the organization may be identified and given the appropriate priority and attention. Following that, suitable measures may be taken by the organization to achieve a better and more accurate and efficient organizational defense against cyber attacks based on at least these top risk attack vectors.

In some embodiments, an attack vector having several instances (e.g., which is relevant for several target assets instantiations) may receive a higher TPOS or some other priority. In some embodiments, combinations of attack method and technology may be ranked according to their number of instances in top risk attack vectors. Combination with high ranking may receive priority when considering the organizational cyber defense.

A system is further disclosed, which may include at least one hardware processor and a non-transitory computer-readable storage medium. The at least one hardware processor may be configured to execute the method of FIG. 3 by a program code stored in the non-transitory computer-readable storage medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method comprising using at least one hardware processor for:
receiving (a) an identification of target assets at risk of being attacked and (b) an identification of the technology layers of the organization, wherein each of the target assets is instantiated, at least in part, in at least one of the technology layers;
constructing multiple attack vectors for each of said target assets, each attack vector comprising: (i) a method of achieving a malicious objective (MAMO), (ii) a method of attack enablement (MAE), and (iii) a method of initial penetration (MIP), wherein for each attack vector: (1) each MAMO is determined from at least one of the target assets, (2) each MAE is determined from at least one of the MAMO, and (3) each MIP is determined from at least one of the MAE; and
estimating the security risk of each of said multiple attack vectors, wherein the estimating of the security risk is based on probabilities of success of the combinations of the technology layer of the respective target asset and the attack vector.

2. The method of claim 1, wherein the MAE comprises a succession of several attack method and technology layer combinations, thereby forming a plurality of paths of the MAE.

3. The method of claim 1, further comprising:
selecting some of the attack vectors with the highest security risks, and
allocating protection resources to the target assets associated with the selected attack vectors.

4. The method of claim 1, wherein:
the determining of multiple MAMO comprises identifying multiple combinations of attack methods and technology layers that achieve the malicious objectives, wherein combinations of the multiple combinations of attack methods and technology layers at which said target asset is instantiated are excluded;
the determining of multiple MAE for each MAMO comprises identifying multiple combinations of attack methods and technology layers that would enable a potential attacker to utilize said MAMO when said potential attacker penetrates the organization system, wherein combinations of attack methods and technology layers at which said target asset is instantiated or at which said MAMO is performed are excluded; and
the determining of multiple MIP for each MAE comprises identifying multiple combinations of attack methods and technology layers that achieve initial penetration to the organization to achieve the MAMO with respect to the instantiation of the target asset, wherein combinations of attack methods and technology layers at which said target asset is instantiated or at which said MAMO is performed are excluded.

5. The method of claim 1, wherein the estimating of the security risk of the attack vector is performed by multiplying the probabilities of success of the combinations of technology layers and attack methods of the attack vector.

6. The method of claim 1, wherein the probability of success of the combinations of a technology layer and an attack method characterizing the MAE of the attack vector is estimated by calculating the mean value of the probabilities of success of all the possible combinations of a technology layer and an attack method for the MAE, wherein the technology layer at which the target asset of said attack vector is instantiated and the technology layers used by the attack methods of the MIP and the MAMO are excluded.

7. The method of claim 6, wherein only the top half probabilities of success of the probabilities of success of all the possible combinations are considered.

8. The method of claim 1 further comprising calculating the probabilities of success of the combinations of a technology layer and an attack method based on the maturity of controls of the organization.

9. A computer program product comprising a non-transitory computer-readable storage medium having program code embodied therewith, the program code executable by at least one hardware processor to:
receive (a) an identification of target assets at risk of being attacked and (b) an identification of the technology layers of the organization, wherein each of the target assets is instantiated, at least in part, in at least one of the technology layers;
construct multiple attack vectors for each of said target assets, each attack vector comprising: (i) a method of achieving a malicious objective (MAMO), (ii) a method of attack enablement (MAE), and (iii) a method of initial penetration (MIP), wherein for each attack vector: (1) each MAMO is determined from at least one of the target assets, (2) each MAE is determined from at least one of the MAMO, and (3) each MIP is determined from at least one of the MAE; and
estimate the security risk of each of said multiple attack vectors, wherein the estimating of the security risk is based on probabilities of success of the combinations of the technology layer of the respective target asset and the attack vector.

10. The computer program product of claim 9, wherein the MAE comprises a succession of several attack method and technology layer combinations, thereby forming a plurality of paths of the MAE.

11. The computer program product of claim 9, wherein:
the determining of multiple MAMO comprises identifying multiple combinations of attack methods and technology layers that achieve the malicious objectives, wherein combinations of the multiple combinations of attack methods and technology layers at which said target asset is instantiated are excluded;
the determining of multiple MAE for each MAMO comprises identifying multiple combinations of attack methods and technology layers that would enable a potential attacker to utilize said MAMO when said attacker penetrates the organization system, wherein combinations of attack methods and technology layers at which said target asset is instantiated or at which said MAMO is performed are excluded; and
the determining of multiple MIP for each MAE comprises identifying multiple combinations of attack methods and technology layers that achieve initial penetration to the organization to achieve the MAMO with respect to the instantiation of the target asset, wherein combinations of attack methods and technology layers at which said target asset is instantiated or at which said MAMO is performed are excluded.

12. The computer program product of claim 9, wherein the estimating of the security risk of the attack vector is performed by multiplying the probabilities of success of the combinations of technology layers and attack methods of the attack vector.

13. The computer program product of claim 9, wherein the probability of success of the combinations of a technology layer and an attack method characterizing the MAE of the attack vector is estimated by calculating the mean value of the probabilities of success of all the possible combinations of a technology layer and an attack method for the MAE, wherein the technology layer at which the target asset of said attack vector is instantiated and the technology layers used by the attack methods of the MIP and MAMO are excluded.

14. The computer program product of claim 13, wherein only the top half probabilities of success of the probabilities of success of all the possible combinations are considered.

15. A system comprising:
- a non-transitory computer-readable storage medium having program code stored thereon; and
- at least one hardware processor configured to execute said program code, wherein in said program code is configured to instruct said at least one hardware processor to:
  (a) receive (i) an identification of the target assets at risk of being attacked and (ii) an identification of the technology layers of the organization, wherein each of the target assets is instantiated, at least in part, in at least one of the technology layers;
  (b) construct multiple attack vectors for each of said target assets, each attack vector comprising: (i) a method of achieving a malicious objective (MAMO), (ii) a method of attack enablement (MAE), and (iii) a method of initial penetration (MIP), wherein for each attack vector: (1) each MAMO is determined from at least one of the target assets, (2) each MAE is determined from at least one of the MAMO, and (3) each MIP is determined from at least one of the MAE; and
  (c) estimate the security risk of each of said multiple attack vectors, wherein the estimating of the security risk is based on probabilities of success of the combinations of the technology layer of the respective target asset and the attack vector.

16. The system of claim 15, wherein the estimating of the security risk of the attack vector is performed by multiplying the probabilities of success of the combinations of technology layers and attack methods of the attack vector.

* * * * *